P. STOVER.
Corn Planter.
No. 28,615.
Patented June 5, 1860.
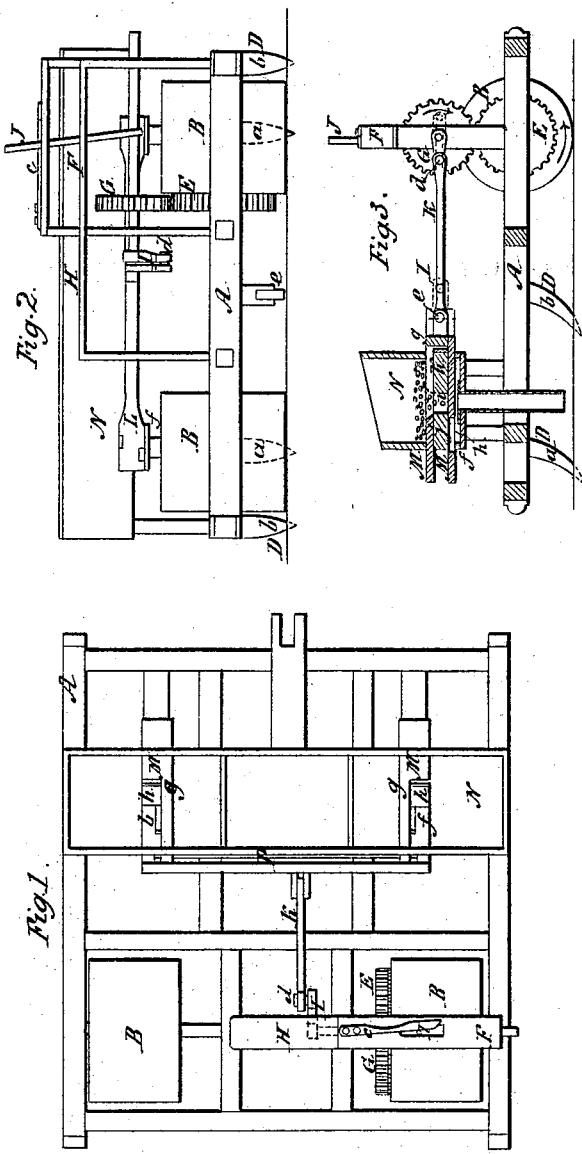

UNITED STATES PATENT OFFICE.

PTOLLMAN STOVER, OF WEST ALEXANDRIA, OHIO.

IMPROVEMENT IN CORN-PLANTERS.

Specification forming part of Letters Patent No. 28,615, dated June 5, 1860.

*To all whom it may concern:*

Be it known that I, PTOLLMAN STOVER, of West Alexandria, in the county of Preble and State of Ohio, have invented a new and useful Improvement in Corn-Planters; and I do hereby declare that the following is a full and exact description of the same, reference being had to the drawing and letters marked thereon, which form a part of this specification.

In the annexed drawings, Figure 1 is a plan view, Fig. 2 a view taken from the back, and Fig. 3 a vertical longitudinal section, of the operating parts.

The frame of the machine, A, rests on three rollers, two of them, B, acting also as traction-rollers and pressing the soil on the seed after it has been planted. The other, C, is placed on a rotating pivot, so that it is capable of acting in some measure as a guide to the machine. Secured to the machine-framing there are also six shovels, D, plows, or implements, two of them, $a$—one before each seed-tube—opening the ground, and four of them, $b$—two to each seed-tube—acting as coverers, and at the same time cultivating the ground as the machine moves along.

On the side of one of the traction-wheels is secured a gear-wheel, E, of a less diameter—in fact, sufficiently small to be out of the way of any obstruction it might meet with on the ground that would be likely to impede its action; and gearing with this wheel is another that has its journals in the upright frame F. This latter wheel, G, can slide in its journals, and on one extremity of its shaft, under the driver's seat H, a crank, I, is placed. By means of the lever or handle J and spring $c$, the driver, when sitting on his seat, can throw these two toothed wheels E and G in and out of gear, as he desires, without moving from his seat, and can retain them in either position by means of the spring $c$ while still guiding the animals drawing the machine, as in turning round or going to or coming from work. A link or connecting-rod, K, is attached by a pin, $d$, to the crank I, and its opposite end is connected by another pin, $e$, to a cross-piece, L, to which rigidly and securely the seed-slides M are attached.

On the frame A, elevated slightly above it on four posts, is the seed-box N, in which the seed-slides M work. These seed-slides are two in number—a lower one, $f$, and an upper one, $g$—both moving at the same time, because both connected to the same piece, L. The upper one, $g$, is so formed as to act as a cut-off valve, the edge of the valve being beveled to carry any seed above it which may be in the way to hinder its motion, and to pass freely through the box full of seed. The lower one, $f$, has an aperture, $h$, in it, through which the seed can pass into the seed-tube O, that delivers the seed to the ground. This aperture $h$ is so placed relatively with the cut-off, as seen in Fig. 3, that, although moving at the same time, the aperture $h$ only opens communication between the measuring-space in the bottom of the seed-box and the seed-tube O when it (the measuring-space) is closed above by the cut-off $g$. This measuring-space $i$ is formed by a groove in the bottom of the box N, closed at one end—the front—by a square piece, $j$, which is secured in its place by a wedge, so that it can be placed in any position—that is to say, farther in or out—to make the measuring-space larger or smaller, to deliver more or less seed as required at each operation of the seed-slides. At the back is another rectangular piece, $k$, which is kept in its place by a spring, P, that, being secured to the back of the seed-box, presses against it, but has at the same time elasticity enough to allow it to yield if any kernel of corn should lodge and, but for this provision, tend to choke the measuring-space and prevent the free action of the seed-slides; but when the seed or kernel of corn is freed and has dropped down the tube into the ground, the spring brings back the piece $k$ to its original position and preserves the measuring-space the proper size which the operator has arranged and requires. The seed-tubes are connected in the ordinary and most convenient way.

The operation of the machine is as follows: When it is drawn along the ground the shovels or shares $a$ make a furrow, in which the seed drops, and the roller B, moving in the direction indicated by the arrow in Fig. 3, gives motion by the toothed wheel E, connected to its side, to the toothed wheel G, and this, by means of the crank T on its shaft and the link, moves the seed-slides and so delivers the seed into the ground, where it is covered by the shares $b$, and the soil pressed down by the traction-rollers B. The extremes of motion to which the crank, link, and seed-slides are subject and the position of the cut-off valve or slide and the delivering one at the different points of the stroke are shown by the red and black lines in Fig. 3.

The peculiar advantage of this corn-planter is that a seed of corn or kernel cannot choke the measuring-space and from its hardness prevent the free action of the slides, and also tend to break the operating parts; but provision being made for this contingency, there is no danger of the machine becoming damaged, and thus causing not only expense and inconvenience, but also hindering the sowing process at the very time when it should be performed with dispatch. Moreover, the machine is simple, cheap, and efficient, and as all its parts are easy of access, should any portion become worn or from accident broken, it can easily and conveniently be replaced, and at the same time the whole machine, when in operation, is under the perfect control of the driver, who can regulate the motion of the slides, either preventing or allowing the deposition of the seed in the ground without moving from his seat.

Having thus described my invention, what I claim, and desire to secure by Letters Patent, is—

The peculiar arrangement of the measuring-space, having an elastic back piece, $k$, and an adjustable front piece, $j$, in connection with the cut-off $g$ and lower slide, $f$, all constructed, arranged, and operating in the manner substantially as and for the purposes set forth and described.

PTOLLMAN STOVER.

Witnesses:
   J. Q. HOLLAND,
   HARVEY KITSON.